3,318,827
STABILIZED POLYAMIDE COMPOSITIONS CONTAINING COPPER OR A COPPER COMPOUND AND ELEMENTARY IODINE
Kenneth Whittaker, Sutton Coldfield, England, assignor to British Nylon Spinners Limited, Pontypool, Monmouthshire, England
No Drawing. Filed Feb. 24, 1966, Ser. No. 529,661
Claims priority, application Great Britain, Feb. 9, 1961, 4,842/61
12 Claims. (Cl. 260—18)

This is a continuation-in-part of my prior copending application Serial No. 170,266 filed January 31, 1962, now abandoned.

The present invention relates to the stabilisation of synthetic linear condensation polyamides, and more particularly to making said polyamides resistant to deterioration due to heat and oxygen.

High molecular weight synthetic linear condensation polyamides, e.g. polyhexamethylene adipamide, are widely used for making textile and other products, for instance, yarns, fabrics, which are noted for their attractive properties including great strength, i.e. a high tenacity and resistance to abrasion. Such yarns and articles made therefrom are accordingly employed not only for apparel and household uses, e.g. curtains, upholstery, but also for industrial purposes, for instance, in the manufacture of belting and tyres. In the latter case the temperature of curing is liable to have a serious effect on the tenactiv of the polyamide yarn. It will thus be understood that in its industrial applications polyamide yarn is frequently apt to be submitted to a greater or lesser degree of heat, and this is known to tend to bring about a deterioration in physical properties, especially a loss of tenacity.

In order to prevent this damage by heat the addition to the polyamide of numerous chemicals has been proposed. These chemicals, which are known as stabilisers, may be incorporated in the polyamide, either in its finished state or at various stages during its manufacture or they may be added to the starting materials before manufacture commences. Only small proportions of such additives are required. Thus the incorporation of copper and its salts is described in French specification No. 906,893. The addition of copper and its salts in conjunction with, inter alia, certain inorganic iodides is the subject of British specification No. 722,724 where it is stated that the latter ingredients increase the heat stability obtained with copper compounds alone. In British specification No. 839,067 there are proposed, inter alia, instead of inorganic iodides, organic iodides derived from difficulty volatile strong organic bases.

While it is true that a number of the stabilisers hitherto put forward afford excellent protection against deterioration by heat, the manufacturer of stabilised polyamide yarn has other difficulties and problems to face, one of which concerns the incorporation of the prescribed additives. To stabiliser salts must normally be capable of being caused to disperse or dissolve in the polyamide in its finished or partially finished condition or it must be possible to add the salts to the starting materials or to the polyamide in such a way that there results a polyamide through which the added salts are uniformly distributed in a homogeneous manner. It is assumed that these salts react with each other and with the polyamide, but, whatever be the correctness of this asumption, the fact remains that there is often a tendency for the copper to separate from the polyamide in the form of a deposit or sediment. Now in the manufacture of filaments, from which the yarn is made, the polyamide is usually melt-spun through a spinneret having minute perforations which are easily blocked by solid particles of adventitious matter which may be in the polyamide. For this reason, immediately before reaching the spinneret, the polyamide is caused to pass through a filter, but when the copper separates from the polyamide these filters themselves become blocked with the resulting deposit. It is possible that the high temperature used in the melt-spinning may be responsible, or partly so, for the separation of the copper. This temperature in the case of polyhexametylene adipamide is about 280° C. Not only does the separation of the copper interrupt the process of melt-spinning, but also the dimished amount of copper remaining in the polyamide affords inferior protection to deterioration by heat. Another difficulty encountered lies in the tendency of the presence of the stabiliser salts, apparently the iodides, though this is uncertain, to interfere with the melt-spinning process by disturbing the smooth flow of the filaments from the spinneret. The extruded polyamide sometimes accumulates near or on the spinneret face and finally the affected filament ceases to be produced, being replaced by a blob of polyamide at the orifice concerned.

It has now been found that these difficulties can be largely overcome by incorporating in the polyamide or its starting materials, in conjunction with a copper salt, elementary iodine. The success of this element for the present purpose is surprising inasmuch as its general properties hardly recommend it. Its low solubility in water and high volatility seem to be physical drawbacks and its uncharged (non-ionic) or elementary condition might have been expected to interfere with the polyamide or polymerisation on account of its known chemical activity. However, although at 20° C. only 1 part of iodine dissolved in 3450 parts of water, at 100° C. 1 part dissolves in only 250 parts of water. Moreover, its solubility in aqueous polyamide starting materials, e.g. an aqueous solution of hexamethylene diammonium adipate is much greater, but it is preferred to add the iodine to the polyamide starting materials in the dissolved form, especially in alcoholic solution.

Accordingly, the present invention relates to a process for making synthetic linear condensation polyamides resistant to deterioration due to heat and oxygen comprising incorporating in said polyamides or adding to the starting materials from which they are made or to the partially polymerised polyamides, copper or a copper compound, and elementary iodine.

Only very small quantities of these additives are required. The following proportions are usually found to be satisfactory, though the optimum amounts depend upon the degree of temperature to which the polyamide is to be submitted. The percentages are calculated with reference to the polyamide.

| Copper or Copper Compound | Iodine |
|---|---|
| From 0.001% to 0.025% (calculated as metallic copper). | From 0.01% to 0.25%. |

The proportion of idoine to copper should usually correspond to at least one atom of iodine for every atom of copper, but it is preferred that five or more atoms of iodine be present for each copper atom.

By way of copper compounds it is desirable to employ water-soluble salts derived from inorganic or organic acids although it is possible satisfactorily to dissolve or disperse in the polyamide most copper compounds (and also copper itself). The few exceptions comprise insoluble interactable compounds such as copper phthalocyanine. Especially are the water-soluble copper salts useful in the case of polyamides derived from diamines and dicarboxylic acids, when the copper or copper compound and iodine are advantageously added to the aqueous diamine dicarboxylate salt solution employed as starting material for the polymerisation.

The iodine is conveniently in a finely divided condition; it can easily be brought into this state by grinding or precipitating from solution.

The invention includes synthetic linear polyamides of improved resistance to deterioration by heat and oxygen, having had incorporated therein copper or a copper compound, and elementary iodine, or made from starting materials or from partially polymerised polyamides to which copper or a copper compound, and elementary iodine have been added.

Examples of the polyamides which come within the invention are:

Polyhexamethylene sebacamide
Polyhexamethylene adipamide
Polyoctamethylene adipamide
Polydecamethylene sebacamide
Poly-epsilon-caprolactam Useful copper salts are, for instance, cupric acetate, cupric salicylate, cupric sulphate, cupric stearate, cuprous iodide, cupric benzoate, cupric nitrate. When it is desired to add the copper salt to the finished polyamide or to a polymerisation mixture which is nearly free of water, an anhydrous copper salt should be chosen.

Other copper compounds which may be employed are: cupric oxide, cuprammonium sulphate. If it be wished to add metallic copper, this should be finely divided or colloidal.

In the following examples which are by way of illustrating, not limiting, the invention the parts and percentages of material are by weight.

EXAMPLE 1

A polyamide is made by heating the following mixture at 250° C. for two hours; the pressure is maintained at 250 lb. per sq. in. by means of a valve adjusted to release steam on the said pressure being exceeded:

|  | Parts |
|---|---|
| Hexamethylene diammonium adipate | 1160 |
| Water | 580 |
| Acetic acid | 3 |
| Cupric acetate monohydrate | 0.095 |
| Iodine | 1.0 |

At the end of the two hours the pressure is allowed to fall to atmospheric pressure and the polymerisation completed by heating thereunder at 270° C. for ½ hour.

The resulting polyamide which contains 30 parts per million of copper is melt-spun at 290° C. into yarn containing 13 filaments and having a total denier of 40, after being drawn in the solid state to 3.21 times its original length.

The breaking load of the above yarn is measured. The yarn is submitted to a temperature of 225° C. for 20 minutes, and the breaking load re-determined. Six tests gave the following figures:

| Breaking Load in Grams | | Percentage of Strength Retained |
|---|---|---|
| Original | After Heating | |
| 172 | 155 | 90 |
| 160 | 155 | 97 |
| 200 | 194 | 97 |
| 186 | 162 | 87 |
| 218 | 203 | 93 |
| 200 | 194 | 97 |

When the cupric acetate and iodine are omitted only 30% of the original strength remains after the above test.

EXAMPLE 2

Example 1 is repeated except that the cupric acetate monohydrate is not added to the reaction mixture until it has been heated at 250° C. for one hour. The resulting yarn proved to have a strength retention of 89%.

EXAMPLE 3

Example 1 is repeated except that the iodine is added in the form of a 20% solution in methanol to the already prepared aqueous solution of hexamethylene diammonium adipate, which already contains acetic acid. The yarn obtained had a strength retention of 85%.

EXAMPLE 4

600 parts by weight of epsilon-caprolactam are heated in a sealed tube under nitrogen together with 30 parts of water, 0.6 part of iodine and 0.06 part of cupric acetate monohydrate, at 240° C. for 3 hours. The pressure is released and the heating continued at 260° C. for 1½ hours under nitrogen at atmospheric pressure.

The resulting polyamide is melt-spun at 240° C. into 5 filaments which are drawn in the solid state to 4.0 times their original length, the resulting yarn having a total denier of 30. When heated at 200° C. for 20 minutes, the strength retention is found to be 97%.

EXAMPLE 5

The following mixture is heated under nitrogen in a sealed tube for 3 hours at 220° C.:

|  | Parts |
|---|---|
| Hexamethylene diammonium adipate | 1160 |
| Water | 12 |
| Acetic acid | 1.35 |
| Cupric oxide | 0.04 |
| Iodine | 1.0 |

The pressure is then released and the mixture heated for a further 1¼ hours at 285° C. under nitrogen at atmospheric pressure.

The resulting polyamide is melt-spun at 285° C. into 5 filaments which are drawn to 4.5 times their original length. The resulting yarn has a total denier of 30. After heating for 20 minutes at 225° C. it is found to exhibit a strength retention of 96%.

EXAMPLE 6

Example 5 is repeated except that 0.03 part of finely divided metallic copper powder is substituted for the 0.04 part of cupric oxide. The resulting yarn has a strength retention of 77%.

What I claim is:

1. Synthetic linear polyamides of improved resistance to deterioration by heat and oxygen, having incorporated therein from 0.001 to 0.025% by weight of said polyamide of copper in the form selected from a member of the group consisting of copper, copper compounds which are soluble in said polyamide and copper compounds which are insoluble in said polyamide but which are dispersible in said polyamide, together with 0.01 to 0.25% by weight of said polyamide of elementary iodine.

2. Synthetic linear polyamides as set forth in claim 1 in which there is at least one atom of iodine for each atom of copper.

3. The composition of claim 1 wherein said polyamide is polyhexamethylene adipamide.

4. The composition of claim 1 wherein said copper compound is cupric acetate.

5. The composition of claim 1 wherein said copper compound is cupric oxide.

6. The composition of claim 1 wherein said copper compound is cupric salicylate.

7. The composition of claim 1 wherein said copper compound is cupric sulfate.

8. The composition of claim 1 wherein said copper compound is cupric stearate.

9. The composition of claim 1 wherein said copper compound is cuprous iodide.

10. The composition of claim 1 wherein said copper compound is cupric benzoate.

11. The composition of claim 1 wherein said copper compound is cupric nitrate.

12. The composition of claim 1 wherein said compound is cuprammonium sulfate.

References Cited by the Examiner

UNITED STATES PATENTS 2,705,227   3/1955   Stamatoff _____ 260—45.75

FOREIGN PATENTS 908,647   10/1962   Great Britain.

LEON J. BERCOVITZ, *Primary Examiner.*

G. W. RAUCHFUSS, *Assistant Examiner.*